(12) United States Patent
Ben Dayan et al.

(10) Patent No.: US 11,016,664 B2
(45) Date of Patent: *May 25, 2021

(54) MANAGEMENT OF FILE SYSTEM REQUESTS IN A DISTRIBUTED STORAGE SYSTEM

(71) Applicant: Weka.IO Ltd., Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Tomer Filiba, Tel Aviv (IL)

(73) Assignee: Weka, IO Ltd.

( * ) Notice: Subject to any disclaimer, the term of this patent is extended or adjusted under 35 U.S.C. 154(b) by 286 days.

This patent is subject to a terminal disclaimer.

(21) Appl. No.: 15/673,643

(22) Filed: Aug. 10, 2017

(65) Prior Publication Data

US 2017/0337217 A1 Nov. 23, 2017

Related U.S. Application Data

(63) Continuation of application No. 15/052,525, filed on Feb. 24, 2016, now Pat. No. 9,773,013.

(Continued)

(51) Int. Cl.
*G06F 3/06* (2006.01)
*G06F 16/182* (2019.01)
(Continued)

(52) U.S. Cl.
CPC ............ *G06F 3/0607* (2013.01); *G06F 3/061* (2013.01); *G06F 3/0604* (2013.01); *G06F 3/067* (2013.01); *G06F 3/0613* (2013.01); *G06F 3/0619* (2013.01); *G06F 3/0635* (2013.01); *G06F 3/0643* (2013.01); *G06F 3/0647* (2013.01); *G06F 3/0656* (2013.01); *G06F 3/0665* (2013.01); *G06F 3/0673* (2013.01); *G06F 3/0685* (2013.01); *G06F 16/182* (2019.01);
(Continued)

(58) Field of Classification Search
CPC .................... G06F 17/30194; G06F 3/0607
See application file for complete search history.

(56) References Cited

U.S. PATENT DOCUMENTS 4,246,637 A 1/1981 Brown et al.
7,447,839 B2 11/2008 Uppala
(Continued)

*Primary Examiner* — Andrew C Georgandellis
(74) *Attorney, Agent, or Firm* — McAndrews, Held & Malloy, Ltd.

(57) ABSTRACT

A first computing device is part of a distributed electronic storage system (DESS) that also comprises one or more second computing devices. The first computing device comprises client process circuitry and DESS interface circuitry. The DESS interface circuitry is operable to: receive, from client process circuitry of the first computing device, a first client file system request that requires accessing a storage resource on one or more of the second computing devices; determine resources required for servicing of the first client file system request; generate a plurality of DESS file system requests for the first file system request; and transmit the plurality of DESS file system requests onto the one or more network links. How many such DESS file system requests are generated is determined based on the resources required for servicing the first client file system request.

16 Claims, 12 Drawing Sheets

Related U.S. Application Data

(60) Provisional application No. 62/288,106, filed on Jan. 28, 2016.

(51) Int. Cl.
| | | |
|---|---|---|
| *H04L 12/911* | (2013.01) | |
| *H04L 29/08* | (2006.01) | |
| *H04L 12/26* | (2006.01) | |
| *H04L 12/801* | (2013.01) | |
| *H04L 12/865* | (2013.01) | |
| *H04L 12/861* | (2013.01) | |
| *H04L 29/06* | (2006.01) | |

(52) U.S. Cl.
CPC ...... *G06F 16/1827* (2019.01); *H04L 43/0882* (2013.01); *H04L 43/16* (2013.01); *H04L 47/12* (2013.01); *H04L 47/6275* (2013.01); *H04L 47/70* (2013.01); *H04L 49/90* (2013.01); *H04L 67/06* (2013.01); *H04L 67/1097* (2013.01); *H04L 67/42* (2013.01)

(56) References Cited

U.S. PATENT DOCUMENTS

| | | | |
|---|---|---|---|
| 7,877,511 B1 | 1/2011 | Berger et al. | |
| 8,347,010 B1 | 1/2013 | Radovanovic | |
| 8,918,478 B2 | 12/2014 | Ozzie et al. | |
| 9,773,013 B2 | 9/2017 | Ben Dayan et al. | |
| 2003/0115218 A1 | 6/2003 | Bobbitt et al. | |
| 2004/0098415 A1 | 5/2004 | Bone et al. | |
| 2005/0289152 A1 | 12/2005 | Earl et al. | |
| 2010/0070656 A1* | 3/2010 | Snell .............. G06F 3/0613 710/5 |
| 2012/0047339 A1 | 2/2012 | Decasper | |
| 2012/0136960 A1 | 5/2012 | Liu | |
| 2013/0103787 A1 | 4/2013 | Glover et al. | |
| 2014/0136571 A1 | 5/2014 | Bonvin et al. | |
| 2014/0172929 A1 | 6/2014 | Sedayao et al. | |
| 2014/0201541 A1 | 7/2014 | Paul et al. | |
| 2014/0244897 A1 | 8/2014 | Goss et al. | |
| 2014/0281280 A1 | 9/2014 | Goss et al. | |
| 2015/0154418 A1 | 6/2015 | Redberg | |
| 2015/0188969 A1 | 7/2015 | Boshev et al. | |
| 2015/0209874 A1 | 7/2015 | Guo et al. | |
| 2015/0210095 A1 | 7/2015 | Anzai | |
| 2015/0248366 A1 | 9/2015 | Bergsten et al. | |
| 2015/0254088 A1 | 9/2015 | Chou et al. | |
| 2015/0309874 A1* | 10/2015 | Liang ............... H03M 13/3761 714/766 |
| 2015/0355971 A1 | 12/2015 | Becker-Szendy et al. | |
| 2015/0379292 A1 | 12/2015 | Lewis | |
| 2015/0381736 A1 | 12/2015 | Seitzer et al. | |
| 2016/0019232 A1 | 1/2016 | Lambright | |
| 2016/0063041 A1 | 3/2016 | Liang | |
| 2016/0065547 A1 | 3/2016 | Heinrich et al. | |

\* cited by examiner

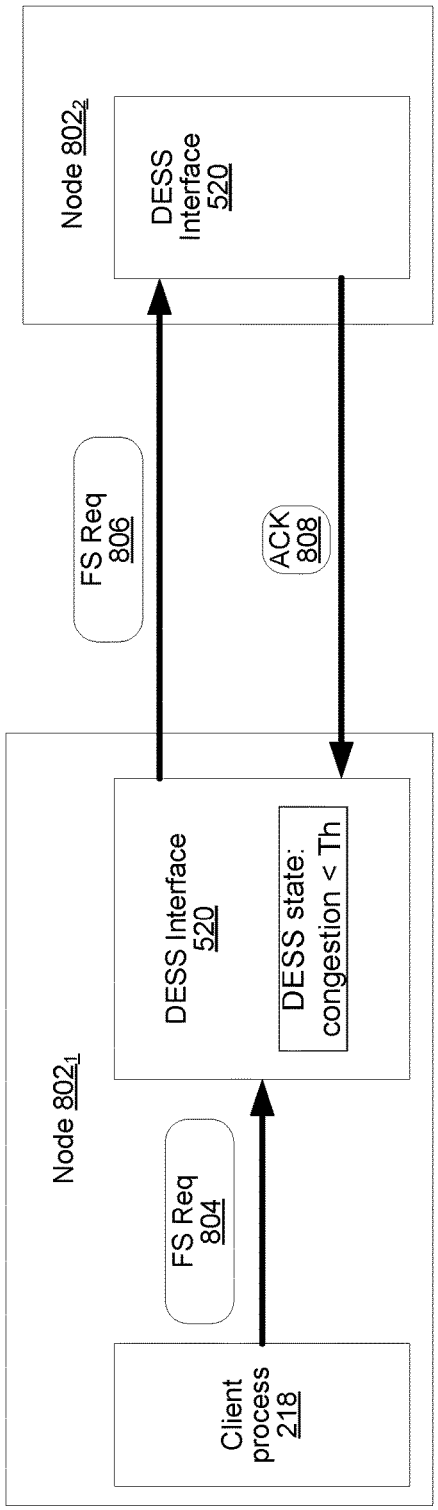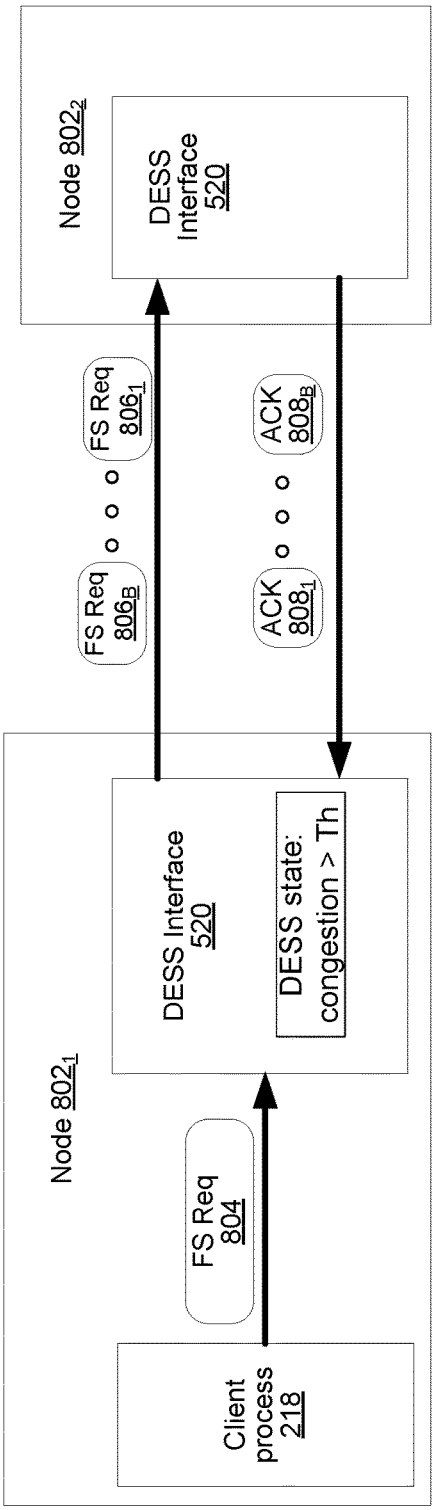
FIG. 8A
FIG. 8B

US 11,016,664 B2

MANAGEMENT OF FILE SYSTEM REQUESTS IN A DISTRIBUTED STORAGE SYSTEM

PRIORITY CLAIM

This application is a continuation of U.S. patent application Ser. No. 15/052,525 filed Feb. 24, 2016, which claims priority to U.S. provisional patent application 62/288,106, filed Jan. 28, 2016. The above-referenced United States Patent Applications are all incorporated by reference herein in their entirety.

INCORPORATION BY REFERENCE

Each of the following documents is hereby incorporated herein by reference in its entirety:
U.S. patent application Ser. No. 14/789,422 titled "Virtual File System Supporting Multi-Tiered Storage" and filed on Jul. 1, 2015;
U.S. patent application Ser. No. 14/833,053 titled "Distributed Erasure Coded Virtual File System" and filed on Aug. 22, 2015;
U.S. patent application Ser. No. 15/041,123 titled "Congestion Mitigation in a Distributed Storage System" and filed on Feb. 11, 2016; and
U.S. patent application Ser. No. 15/041,236 titled "Resource Monitoring in a Distributed Storage System" and filed on Feb. 11, 2016.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for management of file system requests in a distributed storage system substantially as illustrated by and/or described in connection with at least one of the figures, as set forth more completely in the claims.

BRIEF DESCRIPTION OF THE DRAWINGS

FIGS. 8A and 8B illustrate splitting up of large file system requests based on current state of the DESS.

DETAILED DESCRIPTION

Figure 1:
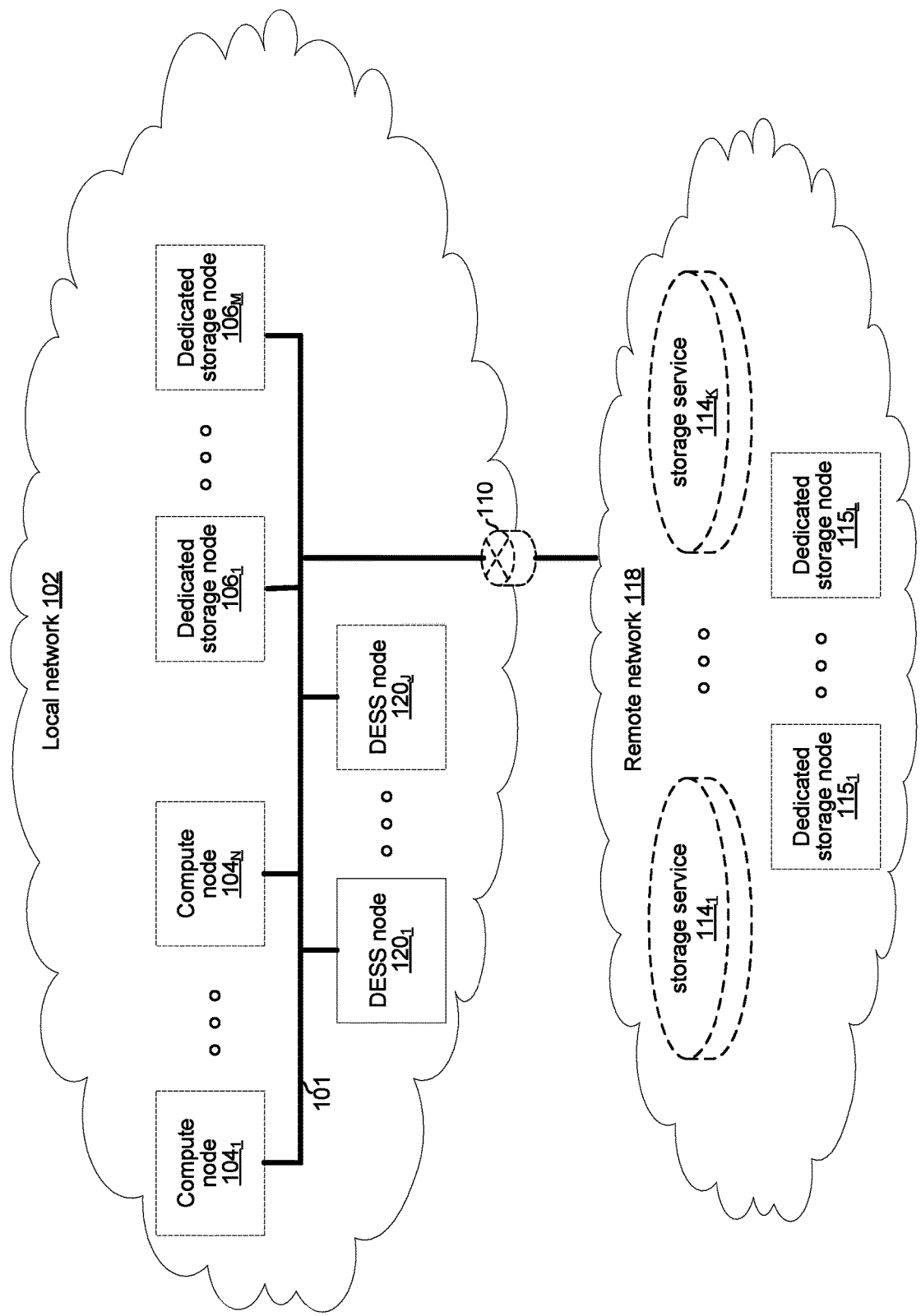
FIG. 1 illustrates various example configurations of a distributed electronic storage system (DESS) in accordance with aspects of this disclosure.

FIG. 1 illustrates various example configurations of a distributed electronic storage system in accordance with aspects of this disclosure. Shown in FIG. 1 is a local area network (LAN) 102 comprising one or more distributed electronic storage system (DESS) nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router 110 that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1). The nodes of the LAN 102 are communicatively coupled via interconnect 101 (e.g., copper cables, fiber cables, wireless links, switches, bridges, hubs, and/or the like).

Each compute node $104_n$ (n an integer, where 1≤n≤N) is a networked computing device (e.g., a server, personal computer, or the like) that comprises circuitry for running a variety of client processes (either directly on an operating system of the node $104_n$ and/or in one or more virtual machines/containers running on the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliably stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where 1≤j≤J) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DESS process" is a process that implements aspects of one or more of: the DESS driver, the DESS front end, the DESS back end, and the DESS memory controller described below in this disclosure (any one or more of which may implement one or more choking processes, as described below). Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client processes. From the perspective of the client process(es), the interface with the DESS may be independent of the particular physical machine(s) on which the DESS process(es) are running. Example configurations of a DESS node $120_j$ are described below with reference to FIG. 3.

Each on-premises dedicated storage node $106_m$ (m an integer, where 1≤m≤M) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where 1≤k≤K) may be a cloud-based service such as Amazon S3, Microsoft Azure, Google Cloud, Rackspace, Amazon Glacier, and Google Nearline.

Each remote dedicated storage node $115_l$ (l an integer, where 1≤l≤L) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
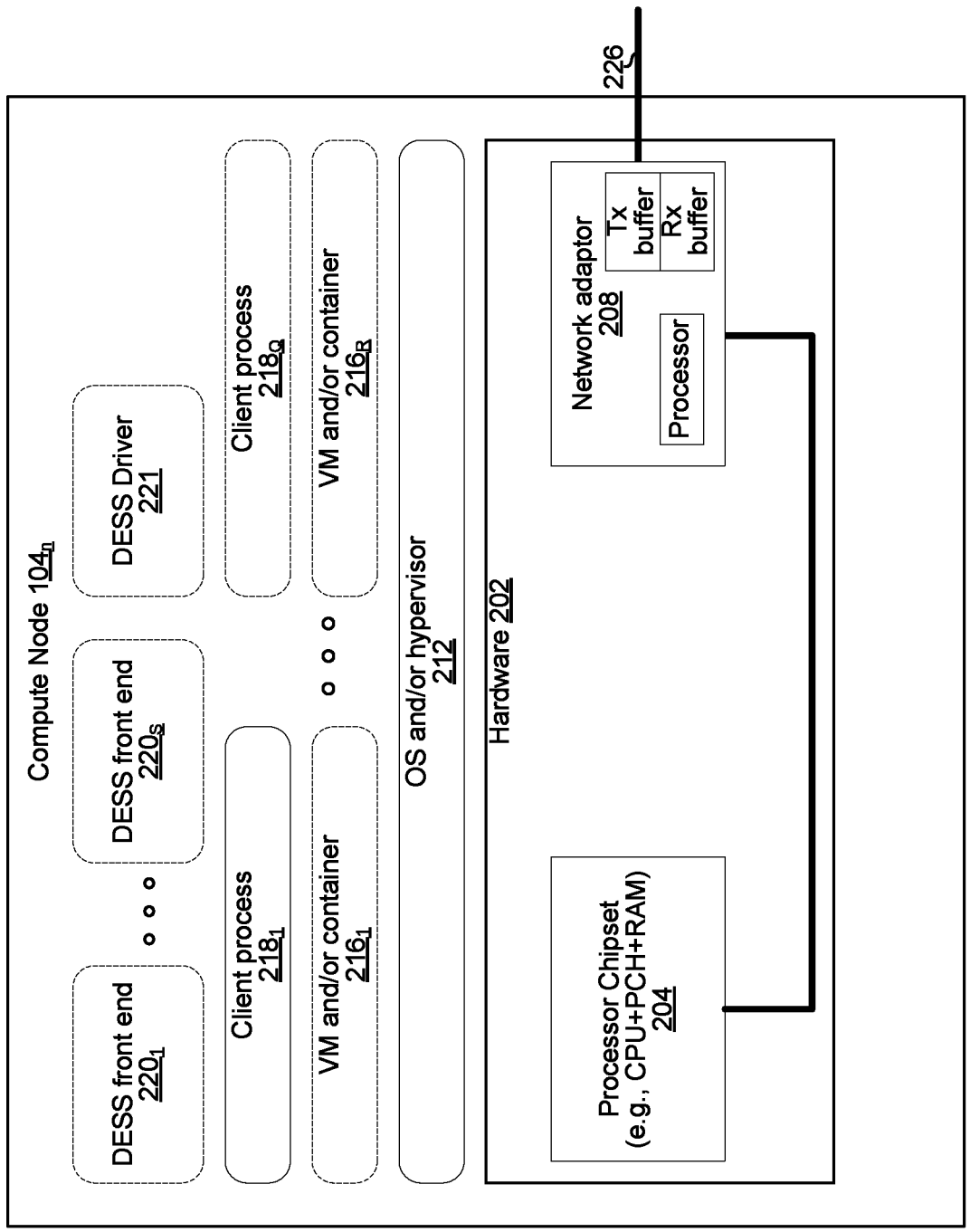
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 of compute node $104_n$ includes at least: an operating system and/or hypervisor 212, one or more client processes 218 (indexed by integers from 1 to Q, for Q≥1) and one or both of: a DESS driver 221 and DESS front end 220. Additional software that may optionally run on the compute node $104_n$ includes: one or more virtual machines (VMs) and/or containers 216 (indexed by integers from 1 to R, for R≥1).

Each client process $218_q$ (q an integer, where 1≤q≤Q) may run directly on an operating system/hypervisor 212 or may run in a virtual machine and/or container $216_r$ (r an integer, where 1≤r≤R) serviced by the OS and/or hypervisor 212.

The DESS driver 221 is operable to receive/intercept local file system commands (e.g., POSIX commands) and generate corresponding file system requests (e.g., read, write, create, make directory, remove, remove directory, link, etc.) to be transmitted to a DESS front-end (either locally or via the interconnect 101). In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (DMB), Common Internet File System (CIFS), and/or the like.

Each DESS front end instance $220_s$ (s an integer, where 1≤s≤S if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on a processor of chipset 204 or on a processor of the network adaptor 208. For a multi-core processor of chipset 204, different instances of the DESS front end 220 may run on different processing cores.

Figure 3:
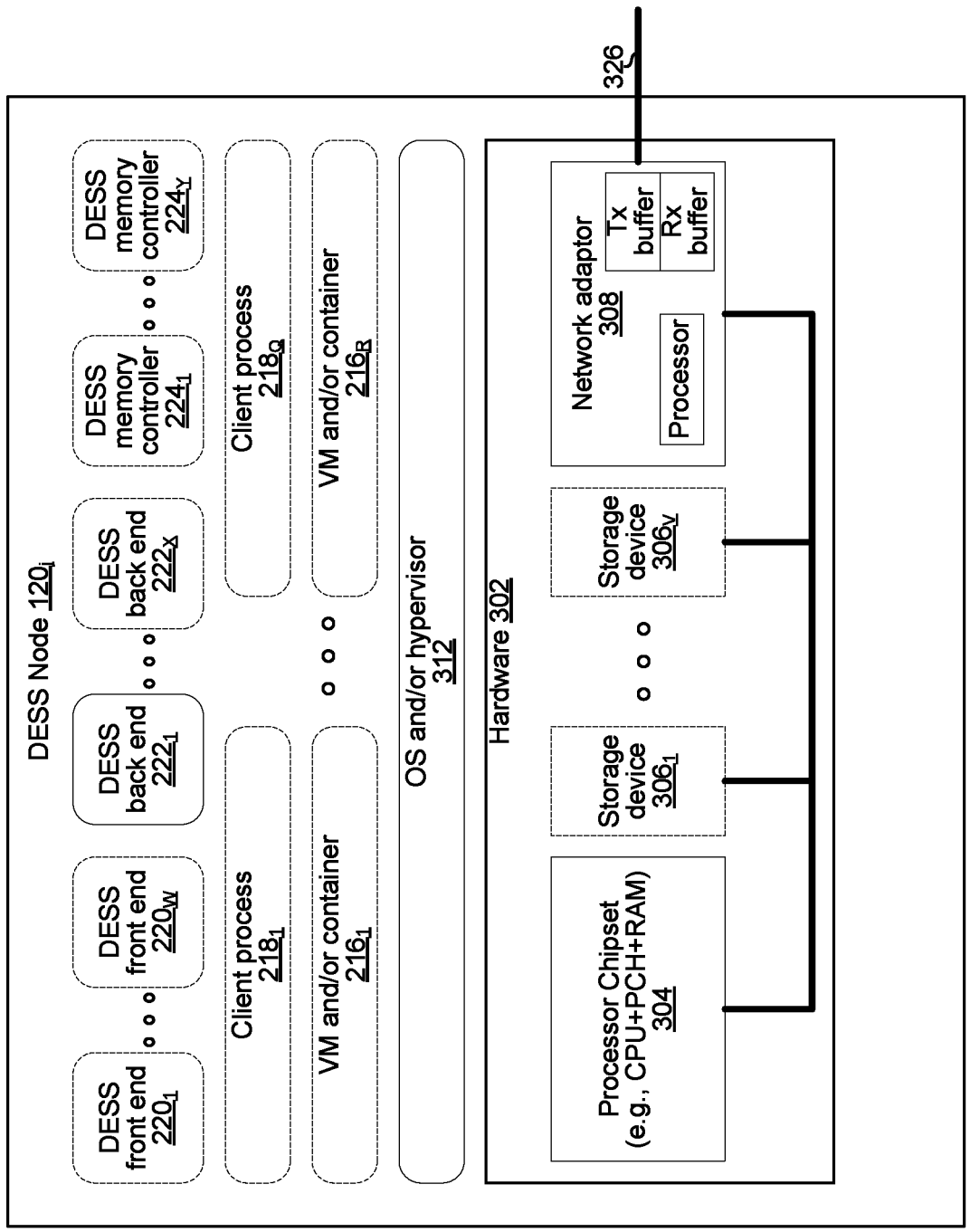
FIG. 3 illustrates various example configurations of a distributed electronic storage system node in accordance with aspects of this disclosure.

FIG. 3 shows various example configurations of a distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for W≥1).

Each storage device $306_p$ (p an integer, where 1≤p≤P if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for W≥1), one or more instances of DESS back end 222 (indexed by integers from 1 to X, for X≥1), and one or more instances of DESS memory controller 224 (indexed by integers from 1 to Y, for Y≥1). Additional software that may optionally run on the hardware 302 includes: one or more virtual machines (VMs) and/or containers 216 (indexed by integers from 1 to R, for R≥1), and/or one or more client processes 318 (indexed by integers from 1 to Q, for Q≥1). As mentioned above, DESS processes and client processes may share resources on a DESS node.

The client processes 218 and VM(s) and/or container(s) 216 are as described above with reference to FIG. 2.

Each DESS front end instance $220_w$ (w an integer, where 1≤w≤W, if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different processing cores.

Each DESS back end instance $222_x$ (x an integer, where 1≤x≤X, if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different processing cores.

Each DESS memory controller instance $224_u$ (u an integer, where 1≤u≤U, if at least DESS memory controller instance is present on DESS node $120_j$) handles interactions with a respective storage device 306 (which may reside in the DESS node $120j$ or another DESS node 120 or a storage node 106). This may include, for example, translating addresses, and generating the commands that are issued to the storage device (e.g., on a SATA, PCIe, or other suitable bus). Thus, the DESS memory controller instance $224_u$ operates as an intermediary between a storage device and the various DESS back end instances of the DESS.

Figure 4:
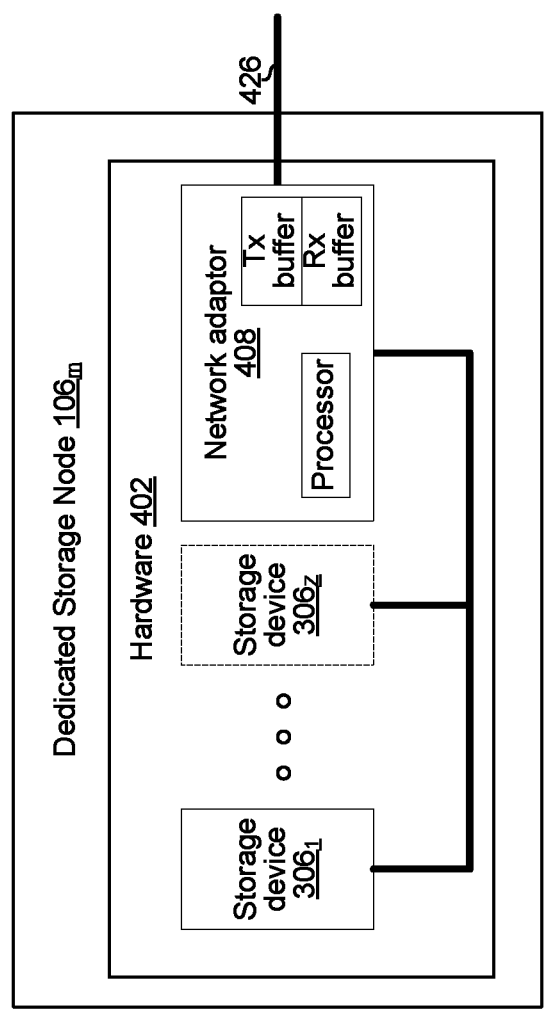
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for Z≥1). Each storage device $306_z$ may be the same as storage device $306_w$ described above with reference to FIG. 3. The network adaptor 408 may comprise circuitry (e.g., an ARM-based processor) and a bus (e.g., SATA, PCIe, or other) adaptor operable to access (read, write, etc.) storage device(s) $406_1$-$406_Z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory, and then migrated to one or more other tier(s) as dictated by data migration policies, which may be user-defined and/or adaptive based on machine learning.

Figure 5A:
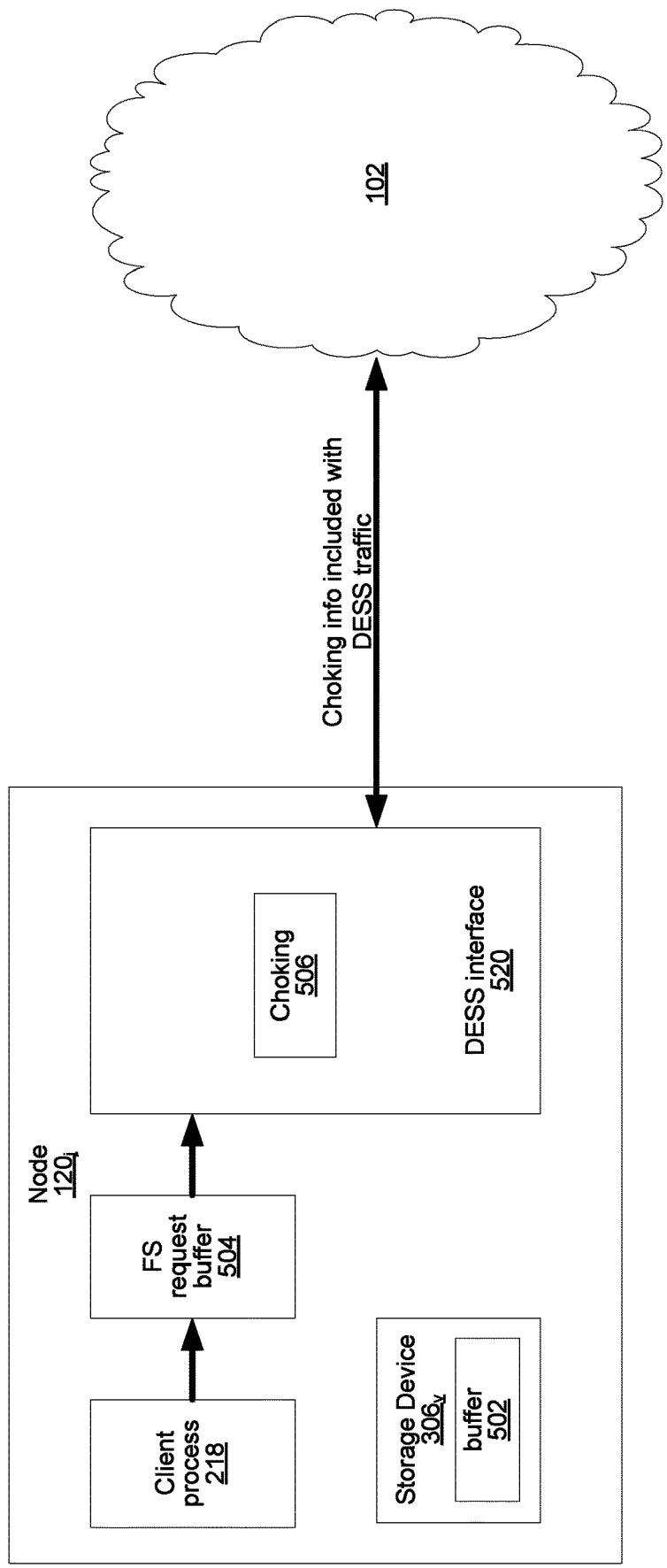
FIG. 5A illustrates an example implementation of a node configured for congestion mitigation in accordance with aspects of this disclosure.

FIG. 5A illustrates a first example implementation of a node configured for congestion mitigation in accordance with aspects of this disclosure. The example DESS node $120_1$ in FIG. 5A comprises circuitry configured to implement a client process 218, a file system request buffer 504, a DESS interface 520, a storage device 306 comprising a buffer 502, and one or more file system choking process(es) 506.

The client process 218 may be as described above with reference to FIGS. 1-4. The client process 218 submits file system requests to the DESS and those file system requests are buffered in file system request buffer 504.

The file system request buffer 504 may, for example, reside in memory of the chipset 204 (FIG. 2) or 304 (FIG. 3). In the example implementation shown, the node $102_1$ comprises only a single buffer 504. In an example implementation in which the DESS comprises a plurality of distributed file systems which are mounted on the node $120_1$, the node $120_1$ may comprise a plurality of buffers 504—one for each of the mounted file systems.

The DESS interface 520 comprises circuitry configured to implement one or more DESS driver instances 221, DESS front-end instances 220, and/or one or more DESS back-end instances 222.

The file system choking process(es) 506 control the rate at which the file system requests in the buffer 504 are fetched by the interface 520 so as to manage congestion in (and, thus, quality of service provided by) the DESS.

The buffer 502 may, for example, comprise RAM within the storage device $306_v$. The buffer 502 is used for buffering data being read from and/or written to nonvolatile storage (e.g., FLASH) of the storage device 306.

In operation, the interface 520 fetches batches of file system requests from the buffer 504, determines which back end instance(s) 222 should service the request(s), generates the appropriate DESS message(s) for conveying the request(s) to the back end(s) 222, and transmits DESS message(s) to the determined back end(s) 222 via the network 102. The back end(s) 222 (possibly including a back end instance 222 of the DESS interface 520 of Node $120_1$) receive the DESS message(s) and perform the necessary operations to carry out the file system request (typically involving reading and/or writing data and/or metadata from/to one or more storage device(s) 306). The rate at which the file system requests are fetched from the buffer 504 is controlled by the choking process(es) 506. In an example implementation, this comprises the choking process(es) 506 determining a choking level and then adjusting one or more settings based on the determined choking level. The one or more settings may comprise, for example: a batch timing setting (i.e., the timing of when file system requests are fetched from the buffer 504), and a batch size setting (i.e., how file system requests are fetched from the buffer 504 at a time). The batch timing setting may, for example, be an interval duration and/or an offset relative to some reference time.

The control of the rate at which file system requests are fetched may be based on information about the state of the DESS. The state information may be based on the load on (i.e., level of usage of) resources of the DESS. The load may be a most-recently measured/recorded load or may be a predicted load based on historical measurement/recordings (for the same DESS and/or other DESSs) being input to a prediction algorithm. Such resources may include resources of the node $120_1$ (DESS resources "local" to node $120_1$). Such resources may also include similar resources of other nodes 104, $120_j$, and/or 106 of the DESS (DESS resources that are "remote" from the perspective of node $120_1$). Information about the loads on remote resources may be determined from DESS messages received from other nodes of the DESS. Similarly, the node $120_1$ may transmit DESS messages which indicate the loads on its resources. Such DESS messages may contain a direct representation of load on one or more resources and/or may contain values calculated based on the load no one or more resources. This bidirectional exchange of choking information gives choking processes 506 throughout the DESS a more holistic view of the state of the DESS, which enables them to more optimally control the rate at which they submit file system requests to the DESS as compared to if they had to control the rate based only on their respective local resource loads.

Resources for which resource load may be monitored include one or more of the following: storage device, CPU, network, and memory. A load on a storage device may, for example, be represented by a single value determined from depth of buffer 502, or represented by two values where the first is determined from depth of read buffer 710 and the second is determined from depth of write buffer 712. A load on a CPU may, for example, be represented by a value corresponding to a running average of percentage of available cycles per second being used. A load on a network adaptor or link may, for example, be represented by a single value determined from depth of transmit and/or receive buffers, or represented by two values where the first is determined from depth of a transmit buffer and the second is determined from depth of a receive buffer. A load on a memory may, for example, be represented by a single value determined from the amount of used (or free) memory.

Details of example operation of the implementation of FIG. 5A will now be described with reference to the flowchart of FIG. 5B.

Figure 5B:
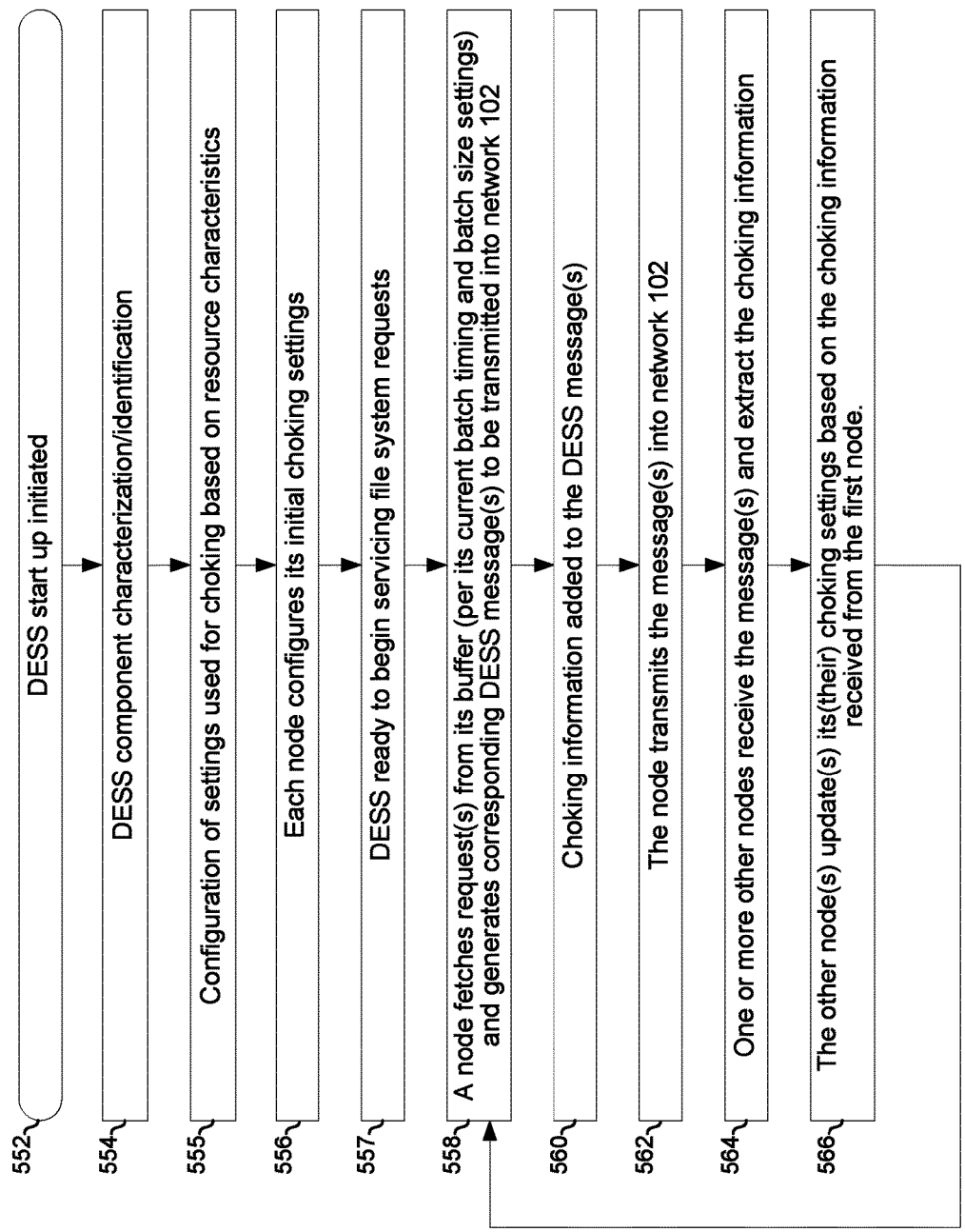
FIG. 5B is a flowchart illustrating an example process for congestion mitigation performed by the node of FIG. 5A.

The process of FIG. 5B begins with block 552 in which the DESS begins its startup/initialization process (e.g., after power up or reset of the node(s) across which it is distributed).

In block 554, various resources (e.g., CPU(s), memory, network adaptor(s), and storage device(s)) of the DESS are characterized. For example, a choking process 506 on each node of the DESS may determine (e.g., through one or more commands supported by the node's operating system) the identity (e.g., manufacturer, model number, serial number, and/or the like) of local resources, and use those identities to retrieve corresponding characteristics from a resource characteristics database (e.g., stored locally in the network 102 and/or accessible via the Internet). For a resource such as a CPU, such characteristics may include, for example, clock speed, cache size, cache speed, number of cores, and/or the like. For a resource such as memory, such characteristics may include, for example, size of memory, speed of memory, and/or the like. For a network adaptor such characteristics may include, for example, latency, maximum throughput, buffer size, and/or the like. For a resource such as a storage device such characteristics may include, for example, size of its buffer 502, write speed (e.g., in input/output operations per second (IOPS)) as a function of the depth (i.e., fill level) of its buffer 502, read speed as a function of the depth of its buffer 502, and/or the like. In instances that a record is not found in the database for an identified resource, a choking process 506 may perform a characterization of the resource before proceeding to block 556. As an example, test reads and/or writes may be issued to a storage device 306 and the resulting read and/or write speed as a function of the depth of its buffer 502 may be monitored and then used to generate a characterization which is then stored to the database.

In block 555, one or more settings used by the choking process(es) 506 are configured based on the resource characteristics determined in block 554. As an example, one or more functions may be used for mapping resource load values to congestion contribution values, mapping congestion contribution values to a choking level, and mapping a choking level to values for a batch timing setting and a batch size setting. Such function(s) may have one or more parameters which may be set based on the characteristics determined in block 554.

In block 556, each node of the DESS determines its initial choking settings (e.g., initial batch timing and batch size settings). The initial choking settings may, for example, be set empirically by a DESS administrator and/or may be set automatically by the choking process 506 based on historical settings used in this DESS and/or other DESSs (e.g., as adapted by a learning algorithm).

In block 557, the DESS is ready to begin servicing file system requests.

In block 558, a DESS interface 520 of a DESS node $120_j$ (Note: the node $120_j$ may be a different node on different iterations through the loop comprising blocks 558-566) fetches file system request(s) from its buffer 504 based on its choking settings (e.g., values of batch timing and batch size), and generates one or more corresponding DESS message(s) (e.g., message(s) to convey the file system requests to the appropriate back end(s) 222).

In block 560, a choking process 506 of the node $120_j$ inserts choking information into the DESS message(s).

In block 562, the node $120_j$ transmits the DESS message(s) into the network 102.

In block 564, other node(s) of the DESS receive the DESS message(s) and extract(s) the choking information.

In block 566, the other node(s) update their choking settings based on the choking information from node $120_j$ and based on their most-recent load information for other resources.

Figure 6:
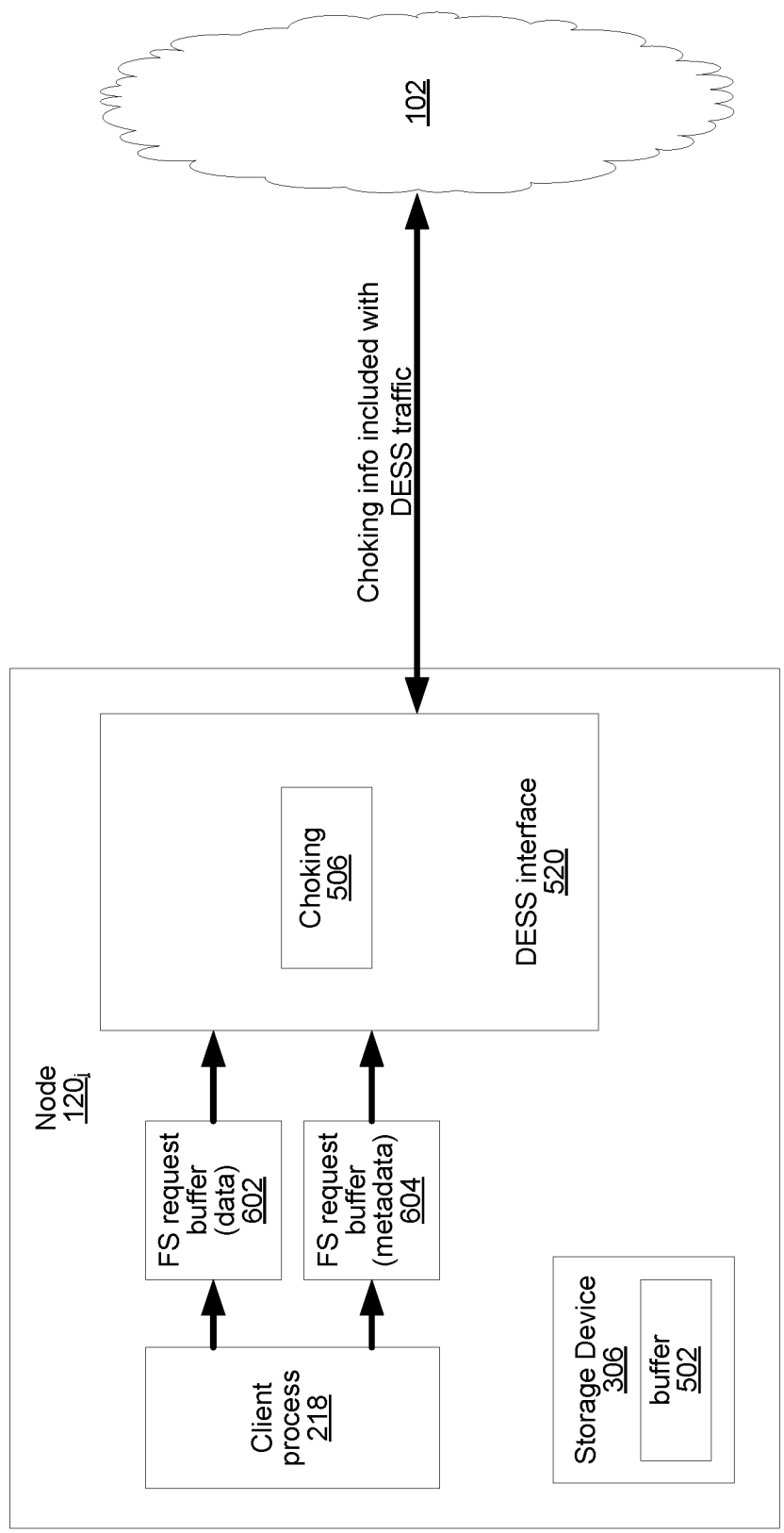
FIG. 6 illustrates another example implementation of a node configured for congestion mitigation in accordance with aspects of this disclosure.

FIG. 6 illustrates another example implementation of a node configured for congestion mitigation in accordance with aspects of this disclosure. FIG. 6 is largely the same as FIG. 5A except the node $120_j$ in FIG. 6 manages different types of file system requests separately. Specifically, file system requests which require reading and/or writing data to/from the distributed file system are managed separately from file system requests which require reading and/or writing metadata to/from the distributed file system. The separate management may be realized, for example, using two separate FIFO buffers 602 and 604 as shown, but may also be realized in other ways such as using a single random access buffer.

In the example implementation shown, the node $102_j$ comprises only a single buffer 602 and a single buffer 604. In an example implementation in which the DESS comprises a plurality of distributed file systems which are mounted on the node $120_j$, the node $120_j$ may comprise a plurality of buffers 602 (one for each file system of the DESS mounted on node $120_j$) and a plurality of buffers 604 (one for each file system of the DESS mounted on node $120_j$).

Operation of the example node $120_j$ of FIG. 6 is similar to as described with reference to FIG. 5A, with the rate at which requests are fetched from buffer 602 being controlled separately from rate at which requests are fetched from buffer 604. For example, choking process(es) 506 of node $120_j$ may control the rate at which file system data requests are fetched from buffer 602 by controlling a data batch timing setting ($T_D$) and a data batch size setting ($S_D$), and may control the rate at which file system metadata requests are fetched from buffer 604 by controlling a metadata batch timing setting ($T_M$) and a metadata batch size setting ($S_M$). The ability to separately control the rate of file system data requests and file system metadata requests is advantageous at least because, in many cases, file system metadata requests are more important than file system data requests because file system metadata requests enable, for example: querying the status of the DESS; making some changes so to optimize in-process file system operations. Further, metadata requests are often run by interactive "human generated" sessions, so getting them to execute quicker results in a higher level of user satisfaction. Accordingly, in some instances when the DESS is getting congested, the choking process(es) 506 may reduce the rate at which requests are fetched from buffer 602 sooner and/or more aggressively than the rate at which requests are fetched from buffer 604. In some instances this may lead to a scenario in which file system metadata requests, but not file system data requests, are fetched during a determined time interval.

Figure 7:
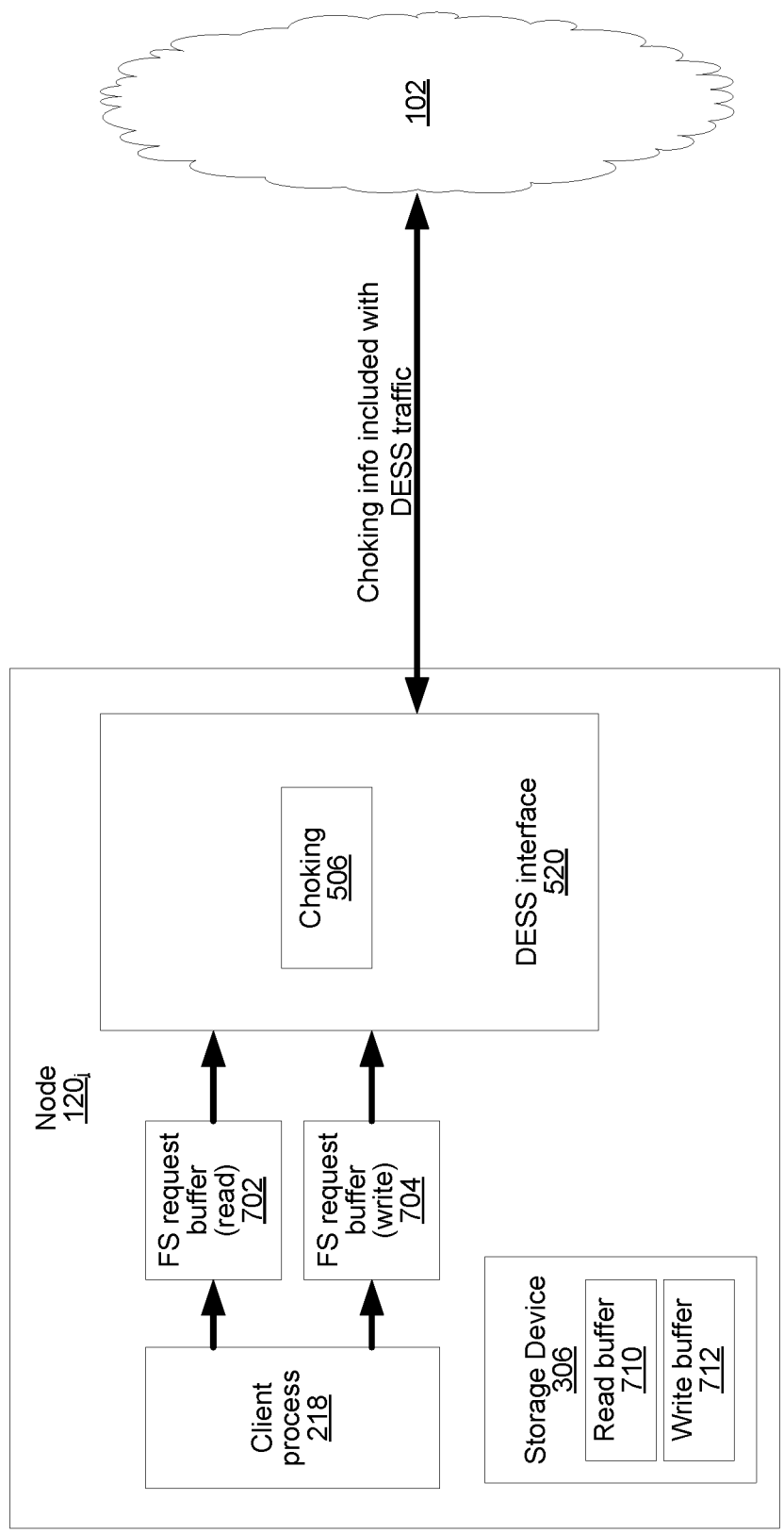
FIG. 7 illustrates another example implementation of a node configured for congestion mitigation in accordance with aspects of this disclosure.

FIG. 7 illustrates another example implementation of a node configured for congestion mitigation in accordance with aspects of this disclosure. FIG. 7 is largely the same as FIG. 6 except, in FIG. 7, the separate management is of file system read requests and file system write requests, rather than of file system data requests and file system metadata requests. The separate management may be realized, for example, using two separate FIFO buffers 702 and 704 as shown, but may also be realized in other ways such as using a single random access buffer.

In the example implementation shown, the node $102_j$ comprises only a single buffer 702 and a single buffer 704. In an example implementation in which the DESS comprises a plurality of distributed file systems which are mounted on the node $120_1$, the node $120_1$ may comprise a plurality of buffers 702 (one for each file system of the DESS mounted on node $120_j$) and a plurality of buffers 704 (one for each file system of the DESS mounted on node $120_j$).

Operation of the example node $120_j$ of FIG. 7 is similar to as described with reference to FIG. 6, with the rate at which requests are fetched from buffer 702 being controlled separately the rate at which requests are fetched from buffer 704. For example, choking process(es) 506 of node $120_j$ may control the rate at which file system data write requests are fetched from buffer 702 by separately controlling a write timing setting ($T_W$), a write batch size setting ($S_W$), a read timing setting ($T_R$), a read batch size setting ($S_R$), metadata batch timing setting ($T_M$), and a metadata batch size setting ($S_M$). The ability to separately control the rate of file system read requests and file system write requests is advantageous at least because, for example, write operations and read operations may use different resources which may become congested at different rates. For example, it may occur at some particular time that there are many read operations pending and thus buffer 710 of storage device 306 cannot accept any more read requests, but buffer 712 has capacity to accept write requests (and resources of the storage device 306 are available to begin working on such write requests). Without separate management of file system read requests and file system write requests, write requests in the buffer 504 (FIG. 5) may be blocked by read requests waiting for resources in storage device 306 to free up. Similarly, it may occur at some particular time that there are many write operations pending and thus buffer 712 of storage device 306 cannot accept any more write requests, but buffer 710 has capacity to accept read requests (and resources of the storage device 306 are available to begin working on such read requests). Without separate management of file system read requests and file system write requests, read requests in the buffer 504 (FIG. 5) may be blocked by read requests waiting for resources in storage device 306 to free up. The implementation of FIG. 7 avoids this problem and permits the DESS to begin working on one or more pending write requests.

FIGS. 8A and 8B illustrate splitting up of large file system requests based on current state of the DESS. Shown in FIGS. 8A and 8B are two nodes $802_1$ and $802_2$ of a DESS. Each of the nodes $802_1$ and $802_2$ may, for example, be a compute node 104 or a DESS node 120. In both FIGS. 8A and 8B, the client process 218 has generated a large client file system request 804, which the DESS interface 520 receives. In response to receiving the client file system request 804, the DESS interface 520 generates one or more DESS file system requests 806 and transmits the DESS file system request(s) 806 to the node $802_2$ via network 102 (e.g., because a back end 222 that is to service the request(s) resides on node $802_2$). After receiving each of the one or more DESS file system requests 806, the DESS interface 520 of node $802_2$ sends an acknowledgment of the DESS file system requests 806.

FIG. 8A illustrates a scenario in which the DESS interface 520 determines that congestion in the DESS is less than a determined threshold. Accordingly, in the scenario in FIG. 8A, the DESS interface 520 of node $802_1$ generates only a single, relatively large (relative to the file system requests $806_1$-$806_N$ of FIG. 8B) DESS file system request 806 corresponding to the client file system request 804.

Conversely, in FIG. 8B, the DESS interface 520 of node $802_1$ determines that congestion in the DESS is above a determined threshold. Accordingly, in the scenario in FIG. 8B, the DESS interface 520 of node $802_1$ generates a plurality of relatively small (relative to the file system request 806 of FIG. 8A) DESS file system requests $806_1$-$806_B$ (B an integer greater than 1) corresponding to the client file system request 804. For example, the client file system request 804 may be a write request and comprise 1 MB of information to be written to a file system of the DESS. In the scenario of FIG. 8A, the DESS file system request 806 comprises the 1 MB of information, whereas in the scenario of FIG. 8B, each of the DESS file system requests $806_1$-$806_B$ may comprise only 4 kB of information (using B=256 as just one example).

Using B smaller DESS file system requests $806_1$-$806_B$, instead of a single larger DESS file system request 806 may provide a variety of benefits under various circumstances. For example, when resources are limited in the DESS (e.g., because of high file system request volume, hardware failure, resources being consumed by non-DESS processes, and/or for any of a variety of reasons) there may be insufficient resources (e.g., memory and/or CPU in node $802_2$) to handle a single large DESS file request 806, but there may be sufficient resources to handle less than all of the B smaller DESS file system requests 806. Accordingly, whereas the single DESS file system request 806 would have to sit queued in node $802_1$ until sufficient resources became available, a first subset of the B smaller DESS file system requests $806_1$-$806_B$ can be sent and begin being serviced by the back end(s). This may help with load balancing in the DESS and may smooth out peaks and valleys in overall usage/congestion of the DESS, thus providing for more predictable/reliable performance of the DESS.

Figure 9A:
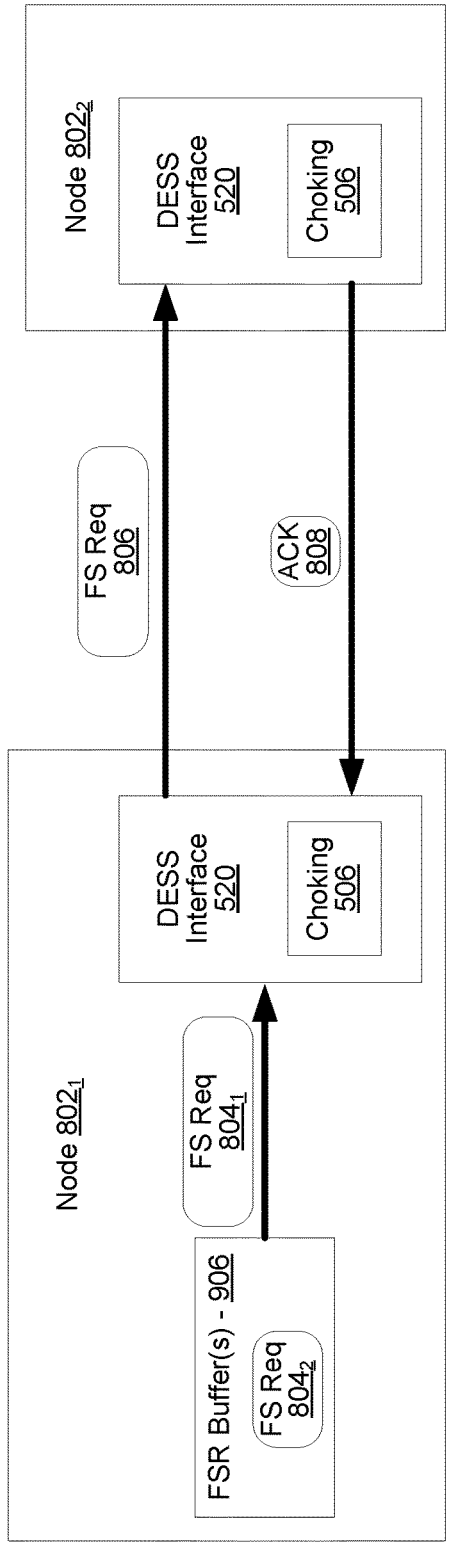
FIGS. 9A and 9B illustrate generating multiple relatively small DESS file system requests for a single large client file system request based on in-queue client file system requests.
Figure 9B:
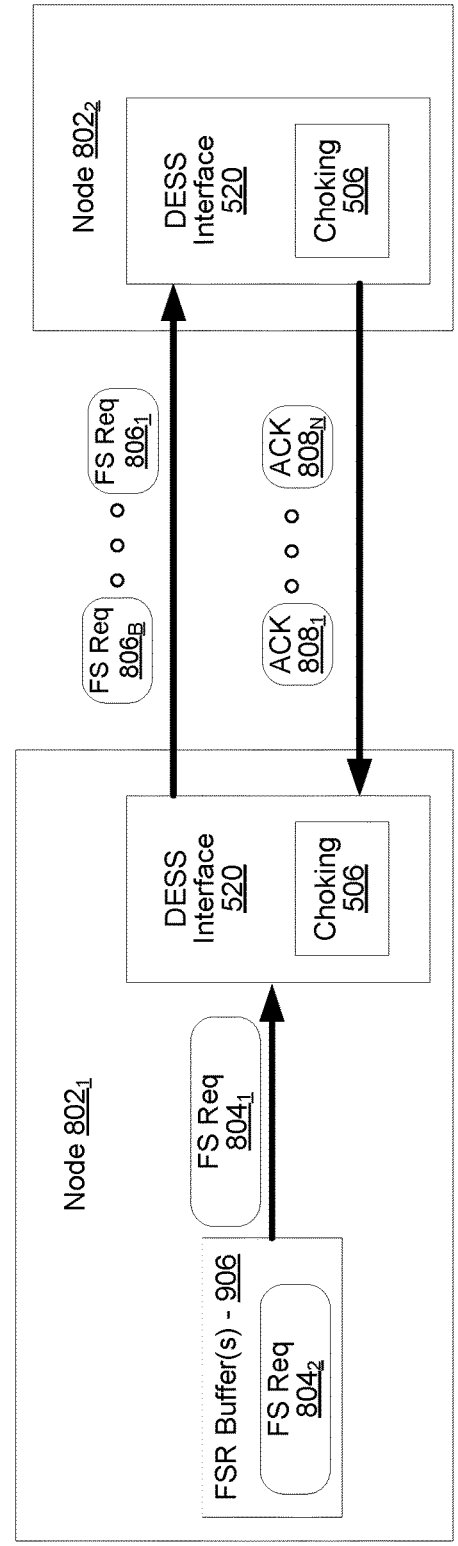

FIGS. 9A and 9B illustrate generating multiple relatively small DESS file system requests for a single large client file system request based on in-queue client file system requests. Shown in FIGS. 9A and 9B are two nodes $802_1$ and $802_2$ of a DESS. Each of the nodes $802_1$ and $802_2$ may, for example, be a compute node 104 or a DESS node 120. The node $902_1$ comprises one or more file system request buffers 906, which may be as described above with reference to FIGS. 5A-7. In both FIGS. 9A and 9B, the client process 218 has generated two client file system requests $804_1$ and $804_2$. In FIGS. 9A and 9B, the DESS interface 520 processes the client file system request $804_1$ and generates one or more corresponding DESS file system requests 806. The DESS file system request(s) 806 are then transmitted to the node $802_2$ via network 102 (e.g., because a back end instance 222 that is to service the request(s) resides on node $802_2$). After receiving each of the one or more DESS file system requests 806, the DESS interface 520 of node $802_2$ sends a corresponding acknowledgment of the DESS file system request 806. In the example implementation depicted, the DESS interface 520 of node $802_1$ determines how many DESS file system requests 806 to generate for the client file system request $804_1$ based on the client file system request $804_2$ that is queued behind the client file system request $804_1$.

FIG. 9A illustrates a scenario in which the first client file system request $804_1$ is relatively large (e.g., relative to the second client file system request $804_2$ and/or relative to a determined threshold) and the second client file system request $804_2$ is relatively small (e.g., relative to the first client file system request $804_2$ and/or relative to a determined threshold). Based, at least in part, on the fact that a relatively small client file system request $804_2$ is queued behind the relatively large client file system request $804_1$, the DESS interface 520 decides to generate a single, larger DESS file system request 806 for the client file system request $804_1$. This decision may, for example, be based on a DESS performance or usage metric (e.g., average file system request size and/or total file system request size over a determined period of time). The DESS interface 520 may be operable to use its knowledge of the requests queued in the buffer(s) 906 to project such a metric into the future (that is, to predict future state of the DESS). Thus, the DESS interface 520 is operable to determine that the metric will not be exceeded when the single large DESS file system request 806 is generated for the large client file system request $804_1$ followed by a small single DESS file system request 806 corresponding to small client file system request $804_2$.

Conversely, FIG. 9B illustrates a scenario in which the first client file system request $804_1$ is relatively large (e.g., relative to a determined threshold) and the second client file system request $804_2$ is also relatively large (e.g., relative to a determined threshold). Based, at least in part, on the fact that a large client file system request $804_2$ is queued behind the large client file system request $804_1$, the DESS interface 520 decides to generate multiple smaller DESS file system requests $806_1$-$806_B$ for the file system request $804_1$. This decision may, for example, be based on a metric (e.g., average file system request size and/or total file system request size over a determined period of time). The DESS interface 520 may be operable to use its knowledge of the requests queued in the buffer(s) 906 to project this metric into the future. Thus, the DESS interface 520 is operable to determine that the metric would be exceeded if a single large DESS file system request 806 was generated for file system request $804_1$ followed by another single large DESS file system request 806 generated for the client file system request $804_2$. Accordingly, the DESS interface 520 decides to generate multiple smaller DESS file system requests $806_1$-$806_B$ corresponding to client file system request $804_1$. Similarly, when the DESS interface 520 is deciding how many DESS file system requests 806 to generate for client file system request 804, the DESS interface 520 may use its knowledge of how the previous client file system request $804_1$ was handled and/or its knowledge of client file system requests which are still queued in buffer(s) 906.

Figure 10:
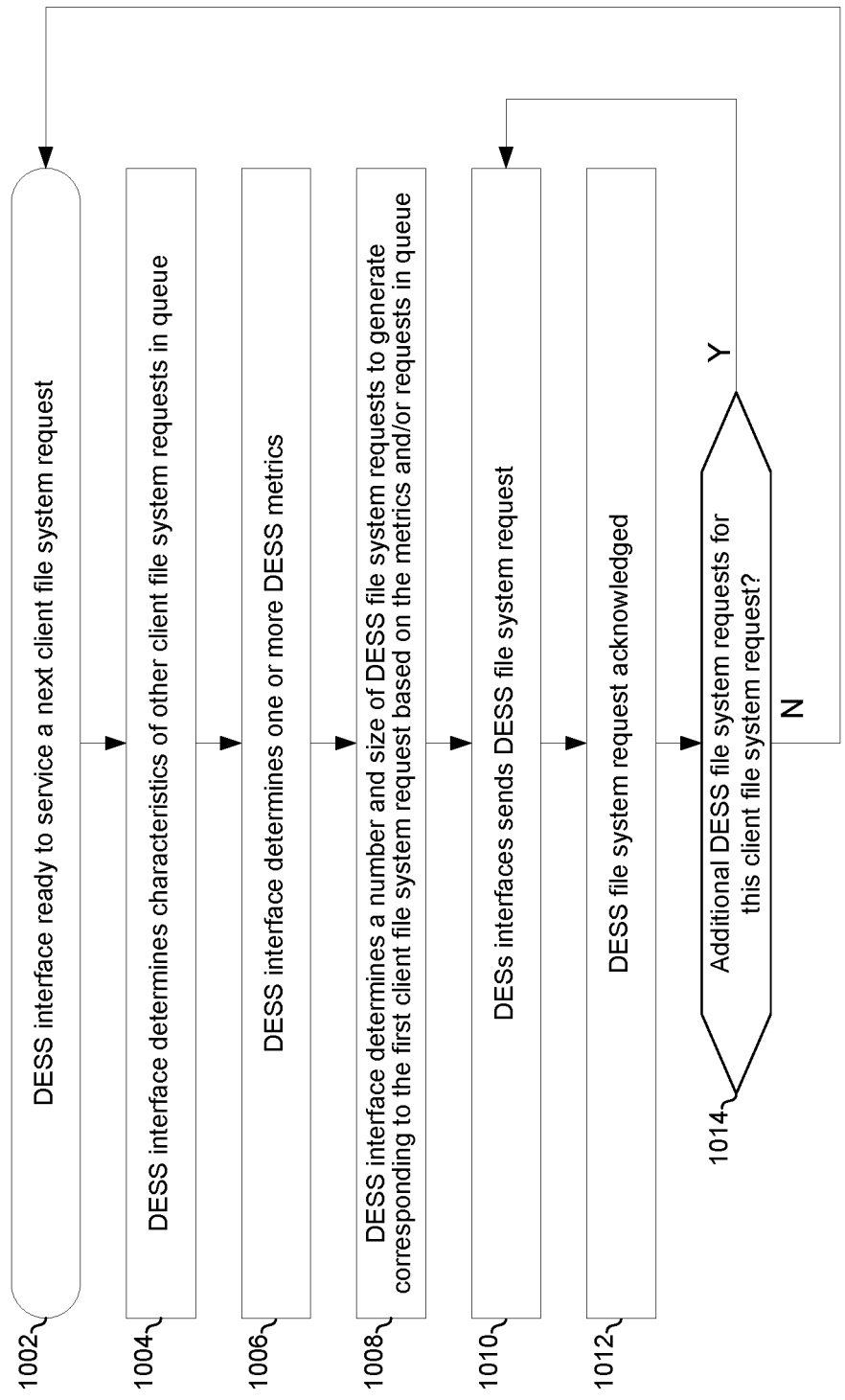
FIG. 10 is a flow chart illustrating an example process for managing file system requests.

FIG. 10 is a flow chart illustrating an example process for managing file system requests. The process begins with block 1002 in which a DESS interface 520 is ready to service a next client file system request waiting in a file system request queue.

In block 1004, the DESS interface determines characteristics of other client file system requests that are in queue waiting to be serviced by the DESS interface. The characteristics may comprise, for example, how many client file system requests are queued, what is/are the type(s) of the queued client file system requests (e.g., data, metadata, read, write, and/or the like), what is/are the size(s) of the queued client file system requests, and/or the like.

In block 1006, the DESS interface determines one or more DESS metrics. Such metric(s) may include, for example, a load on one or more resources of the DESS (e.g., measured as a percentage of the resource(s) that is/are in use), number of DESS input/output operations per time interval, number of DESS file system requests serviced per time interval, number of client file system requests serviced per time interval, average DESS file system request size, average client file system request size, and/or the like. The metric(s) may, for example, be calculated as a moving average. The metrics may be based on DESS file system requests currently being generated by the DESS interface, client file system requests currently being generated by the DESS interface, client file system requests previously processed by the DESS interface, DESS file system requests previously generated by the DESS interface, and/or client file system requests currently in queue. The metric(s) may be for a current state of the DESS and/or a predicted state of the DESS.

In block 1008, the DESS interface determines a number and size of DESS file system requests to generate corresponding to the client file system request based on the metrics and/or other client file system requests in queue. Where more than one DESS file system request is generated for a single client file system request, the sizes of the multiple DESS file system requests may have any desired distribution (e.g., normal, Gaussian, bimodal, linearly increasing, linearly decreasing, exponentially increasing, exponentially decreasing, etc.).

In block 1010, the DESS interface sends a DESS file system request.

In block 1012, the DESS interface receives an acknowledgment of the DESS file system request sent in block 1010.

In block 1014, if there are additional DESS file system requests corresponding to the current client file system request, then the process returns to block 1010. Otherwise, the process returns to block 1002.

Figure 11:
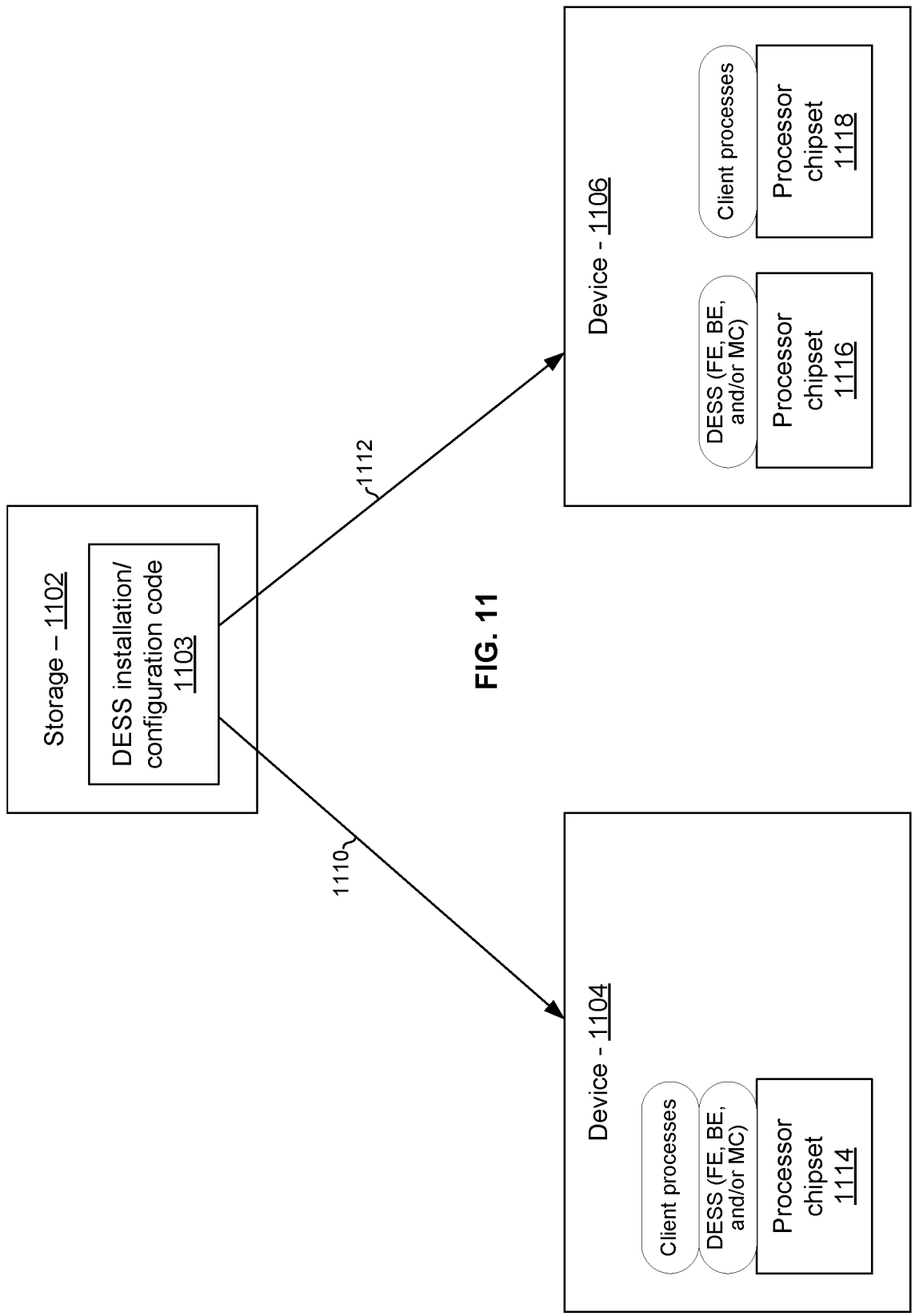
FIG. 11 is a block diagram illustrating configuration of a DESS from a non-transitory machine-readable storage media.

FIG. 11 is a block diagram illustrating configuration of a DESS from a non-transitory machine-readable storage media. Shown in FIG. 11 is non-transitory storage 1102 on which resides code 1103. The code is made available to computing devices 1104 and 1106 (which may be compute nodes, DESS nodes, and/or dedicated storage nodes such as those discussed above) as indicated by arrows 1110 and 1112. For example, storage 1102 may comprise one or more electronically addressed and/or mechanically addressed storage devices residing on one or more servers accessible via the Internet and the code 1103 may be downloaded to the devices 1004 and 1006. As another example, storage 1102 may be an optical disk or FLASH-based disk which can be connected to the computing devices 1104 and 1106 (e.g., via USB, SATA, PCIe, and/or the like).

When executed by a computing device such as 1104 and 1106, the code 1103 may install and/or initialize one or more of the DESS driver, DESS front-end, DESS back-end, DESS memory controller on the computing device. This may comprise copying some or all of the code 1103 into local storage and/or memory of the computing device(s) 1104 and/or 1106 and beginning to execute the code 1103 (launching one or more DESS processes) by one or more processors of the computing device(s) 1104 and/or 1106. Which of code corresponding to the DESS driver, code corresponding to the DESS front-end, code corresponding to the DESS back-end, and/or code corresponding to the DESS memory controller is copied to local storage and/or memory of the computing device(s) 1104 and/or 1106 and is executed by the computing device(s) 1104 and/or 1106 may be configured by a user during execution of the code 1103 and/or by selecting which portion(s) of the code 1103 to copy and/or launch. In the example shown, execution of the code 1103 by the device 1104 has resulted in one or more client processes and one or more DESS processes being launched on the processor chipset 1114. That is, resources (processor cycles, memory, etc.) of the processor chipset 1114 are shared among the client processes and the DESS processes. On the other hand, execution of the code 1103 by the device 1106 has resulted in one or more DESS processes launching on the processor chipset 1116 and one or more client processes launching on the processor chipset 1118. In this manner, the client processes do not have to share resources of the processor chipset 1116 with the DESS process(es). The processor chipset 1118 may comprise, for example, a process of a network adaptor of the device 1106.

In accordance with an example implementation of this disclosure, a first computing device (e.g., $802_1$) is part of a distributed electronic storage system (DESS) that also comprises one or more second computing devices (e.g., $802_2$), where the first and second computing devices are coupled via one or more network links (e.g., 101). The first computing device comprises client process circuitry (e.g., circuitry configured to implement process 218) and DESS interface circuitry (e.g., 520). The client process circuitry is operable to generate client file system requests (e.g., $804_1$ and $804_2$) for a file system of the DESS. The DESS interface circuitry (e.g., 520) is operable to receive, from the client process circuitry, a first client file system request (e.g., $804_1$) that requires accessing a storage resource on one or more of the second computing devices. The DESS interface circuitry (e.g., 520) is operable to determine resources required for servicing of the first client file system request. The DESS interface circuitry (e.g., 520) is operable to generate a plurality of DESS file system requests (e.g., $806_1$-$806_B$) for the first file system request. How many DESS file system requests are in the plurality of DESS file system requests is determined based on the resources required for servicing the first client file system request. The DESS interface circuitry (e.g., 520) is operable to transmit the plurality of DESS file system requests onto the one or more network links. The determination of resources required for servicing the first client file system request may comprise a determination of an amount of information to be read or written during servicing of the client file system request. The first client file system request may be a request to write data to the file system, and the determination of resources required for servicing the first client file system request may comprise a determination of the size (e.g., in bytes) of the information to be written. The DESS interface circuitry is operable to determine a level of congestion of the DESS, and how many of the DESS file system requests are in the plurality of DESS file system requests may be determined based on the level of congestion of the DESS. The determination of the level of congestion of the DESS may comprise a determination of a load on one or more resources of the DESS. The DESS interface circuitry may be operable to determine characteristics of one or more second client file system requests (e.g., $804_2$) queued to be serviced by the DESS interface circuitry. How many of the DESS file system requests are in the plurality of DESS file system requests may be determined based on the characteristics of the one or more in-queue client file system requests. The characteristics of the one or more in-queue client file system requests may comprise how many there are of the one or more in-queue client file system requests. The characteristics of the one or more in-queue client file system requests may comprise whether the in-queue file system requests are data requests or metadata requests. The characteristics of the one or more in-queue file system requests comprise the size (e.g., in bits) of the one or more in-queue file system requests.

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable storage medium (e.g., FLASH drive(s), optical disk(s), magnetic storage disk(s), and/or the like) having stored thereon one or more lines of code executable by a computing device, thereby configuring the machine to be configured to implement one or more aspects of the methods and systems described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system, comprising:
a first computing device communicatively coupled to a second computing device, wherein a distributed electronic storage system (DESS) comprises the first computing device and the second computing device, the first computing device comprising:
DESS interface circuitry comprising:
a receive buffer operable to receive and store a plurality of file system requests, wherein the plurality of file system requests are for access to a storage resource on the second computing device and the plurality of file system requests comprises a first file system request and a second file system request; and
a transmit buffer operable to store and transmit a plurality of DESS requests, wherein a DESS request of the plurality of DESS requests is transmitted to the second computing device via a network link; and
DESS control circuitry operable to:
determine resources required for servicing each of the plurality of file system requests;
determine characteristics of each of the plurality of file system requests;
determine a rate of file system requests from the receipt of the plurality of file system requests, wherein the rate of file system requests is measured per a unit of time;
predict a state of the DESS according to the resources required for servicing the first file system request, the characteristics of the second file system request, and the rate of file system requests; and
generate the plurality of DESS requests for the first file system request, wherein how many DESS requests are in the plurality of DESS requests is determined according to the predicted state of the DESS.

2. The system of claim 1, wherein the resources required for servicing a file system request of the plurality of file system requests is based on an amount of information to be read during servicing of the file system request of the plurality of file system requests.

3. The system of claim 1, wherein the resources required for servicing a file system request of the plurality of file system requests is based on an amount of information to be written during servicing of the file system request of the plurality of file system requests.

4. The system of claim 1, wherein the DESS control circuitry is operable to:
determine a level of congestion of the DESS; and
determine how many DESS file system requests are in the plurality of DESS file system requests is determined according to the level of congestion of the DESS.

5. The system of claim 4, wherein the determination of the level of congestion of the DESS comprises a determination of a load on one or more resources of the DESS.

6. The system of claim 5, wherein the one or more resources comprises one or more of: processor resources, memory resources, storage resources, and networking resources.

7. The system of claim 1, wherein how many DESS file system requests are in the plurality of DESS file system requests is determined according to whether the second file system request is a data request or metadata request.

8. The system of claim 1, wherein the characteristics of a file system request in the plurality of file system requests comprise the size of the file system request.

9. One or more non-transitory machine-readable storage medium having code stored thereon, that, when executed by a first computing device configures the first computing device to:
receive a plurality of file system requests, wherein the plurality of file system requests are for access to a storage resource on a second computing device and the plurality of file system requests comprises a first file system request and a second file system request, wherein a distributed electronic storage system (DESS) comprises the first computing device and the second computing device;
determine resources required for servicing each of the plurality of file system requests;
determine characteristics of each of the plurality of file system requests;
determine a rate of file system requests from the receipt of the plurality of file system requests, wherein the rate of file system requests is measured per a unit of time;
predict a state of the DESS according to the resources required for servicing the first file system request, the characteristics of the second file system request, and the rate of file system requests;
generate the plurality of DESS requests for the first file system request, wherein how many DESS requests are in the plurality of DESS requests is determined according to the predicted state of the DESS; and
transmit a plurality of DESS requests, wherein a DESS request of the plurality of DESS requests is transmitted to the second computing device via a network link.

10. The one or more non-transitory machine-readable medium of claim 9, wherein the resources required for servicing a file system request of the plurality of file system requests is based on an amount of information to be read during servicing of the file system request of the plurality of file system requests.

11. The one or more non-transitory machine-readable medium of claim 9, wherein the resources required for servicing a file system request of the plurality of file system requests is based on an amount of information to be written during servicing of the file system request of the plurality of file system requests.

12. The one or more non-transitory machine-readable medium of claim 9, wherein how many DESS file system requests are in the plurality of DESS file system requests is determined according to a level of congestion of the DESS.

13. The one or more non-transitory machine-readable medium of claim 12, wherein the determination of the level of congestion of the DESS comprises a determination of a load on one or more resources of the DESS.

14. The one or more non-transitory machine-readable medium of claim 13, wherein the one or more resources comprises one or more of: processor resources, memory resources, storage resources, and networking resources.

15. The one or more non-transitory machine-readable medium of claim 9, wherein how many of the DESS file system requests are in the plurality of DESS file system requests is determined based on whether the second file system request is a data request or metadata request.

16. The one or more non-transitory machine-readable medium of claim 9, wherein the characteristics of a file system request in the plurality of file system requests comprise the size of the file system request.

* * * * *